United States Patent [19]

Hayano

[11] Patent Number: 4,835,770
[45] Date of Patent: May 30, 1989

[54] MULTIPLEXER/DEMULTIPLEXER CIRCUITRY FOR LSI IMPLEMENTATION

[75] Inventor: Shin-ichiro Hayano, Tokyo, Japan

[73] Assignee: NEC Corporation, Japan

[21] Appl. No.: 101,952

[22] Filed: Sep. 28, 1987

[30] Foreign Application Priority Data

Sep. 29, 1986 [JP] Japan ................ 61-228296
Sep. 29, 1986 [JP] Japan ................ 61-228297
Sep. 29, 1986 [JP] Japan ................ 61-231475
Sep. 30, 1986 [JP] Japan ................ 61-229527

[51] Int. Cl.⁴ .............................................. H04J 3/06
[52] U.S. Cl. .................................... 370/94; 370/86; 370/100; 370/106
[58] Field of Search ............... 370/94, 112, 85, 86, 370/95, 100, 106

[56] References Cited

U.S. PATENT DOCUMENTS 4,482,999 11/1984 Janson et al. ............... 370/86
4,594,708 6/1986 Servel et al. ............... 370/100
4,727,542 2/1988 Rokugo et al. ............... 370/112

Primary Examiner—Douglas W. Olms
Assistant Examiner—Min Jung
Attorney, Agent, or Firm—Laff, Whitesel, Conte & Saret

[57] ABSTRACT

A multiplexer/demultiplexer comprises a code pattern generator for generating a series of unique code patterns at periodic intervals, a plurality of multiplexers cascaded from the code pattern generator to one end of a channel. Each of the multiplexers includes a synchronizer for detecting a particular one of the unique code patterns and a slot selector for multiplexing input data packets into time slots uniquely identified by the particular code pattern to form a data bit stream with the code patterns which is forwarded to the channel. A plurality of demultiplexers are connected to the opposite end of the channel, each of the demultiplexers comprising a synchronizer for detecting a particular one of the code patterns from the data bit stream and a gate for extracting data packets from the time slots uniquely identified by the detected code pattern.

12 Claims, 13 Drawing Sheets

SLOT POSITION DETECTOR 66 OR 70

MULTIPLEXER/DEMULTIPLEXER CIRCUITRY FOR LSI IMPLEMENTATION

BACKGROUND OF THE INVENTION

The present invention relates to a multiplexer/demultiplexer for high speed switching applications.

The multiplier stage of conventional multiplexer/demultiplexer circuitry usually comprises a sync pattern generator, an address counter and an array of gates. The address counter is reset at frame intervals by a sync from the frame pattern generator to successively increment its count at slot intervals to generate a binary count. The output of the counter is used as an address for accessing each of the multiplexer gates for multiplexing data bits into specified time slots of a data bit stream. The demultiplexer stage of the circuitry includes an array of gates, a frame synchronizer and a second counter. The frame synchronizer detects the sync pattern of the data bit stream to cause the second counter to synchronize with the slot timing of the bit stream to increment its binary count. The demultiplexer gates are respectively enabled by the address counts of the second counter to demultiplex the individual data bits into output terminals.

LSI chips currently available for high speed switching operations have a level of integration which is lower than is required for implementing multiplexers and demultiplexers of the above mentioned type due to their complexity.

SUMMARY OF THE INVENTION

An object of the present invention is therefore to provide multiplexer/demultiplexer circuitry that can be implemented by LSI chips.

The object is achieved by segmenting each of the multiplexer and demultiplexer stages of the circuitry into multiplexers of simplified configuration on a per input basis and demultiplexers of simplified configuration on a per output basis and connecting them in a common channel. The multiplexer/demultiplexer of the present invention can be advantageously used as a time switch for a time division switching system or as a local area network by effecting slight modifications.

The multiplexer/demultiplexer of the present invention comprises a sync pattern generator for generating a series of unique sync patterns at periodic intervals, a plurality of multiplexers cascaded from the sync pattern generator to one end of a channel. Each of the multiplexers includes a synchronizer for detecting a particular one of the unique sync patterns and a slot selector for multiplexing input data bits into time slots uniquely identified by the particular sync pattern to form a data bit stream with the sync patterns which is forwarded to the channel. A plurality of demultiplexers are connected to the opposite end of the channel, each of the demultiplexers comprising a synchronizer for detecting a particular one of the sync patterns from the data bit stream and a gate for extracting data bits from the time slots uniquely identified by the detected sync pattern.

According to a specific aspect of the present invention, a time division switching system is provided which comprises a sync pattern generator for generating a series of unique sync patterns at periodic intervals, a plurality of multiplexers cascaded from the sync pattern generator to one end of a channel. Each of the multiplexers comprises a synchronizer for detecting one of the sync patterns and a slot selector for multiplexing input data bits into time slots uniquely identified by the detected sync pattern to form a data bit stream with the sync patterns and forwarding the data bit stream to the channel. A plurality of demultiplexers are connected to the opposite end of the channel. Each demultiplexer comprises a synchronizer for detecting one of the sync patterns in the data bit stream and a gate for extracting data bits from the time slots uniquely identified by the detected sync pattern. The unique sync patterns detected by the synchronizers of the multiplexers or demultiplexers are determined by a switching control circuit to provide time slot switching between a desired multiplexer and a desired demultiplexer.

According to a further aspect of the invention, a local area network is provided having a plurality of nodes connected in a common network loop. The network comprises a code pattern generator connected in the network loop for generating a series of unique code patterns respectively assigned to the nodes. Each of the nodes comprises a transmit circuit for detecting one of the unique code patterns which is assigned to a destination node and multiplexing data packets of the own node into time slots uniquely identified by the particular unique code to form a data bit stream with the unique code patterns and forwarding the data bit stream to an adjacent one of the nodes. A receive circuit is included in each of the nodes for receiving the data bit stream from the network loop and detecting one of the code patterns in the received bit stream which is uniquely assigned to the own node and extracting data packets from time slots which are uniquely identified by the detected code pattern.

BRIEF DESCRIPTION OF THE DRAWINGS

The present invention will be described in further detail with reference to the accompanying drawings, in which.

DETAILED DESCRIPTION

Figure 1:
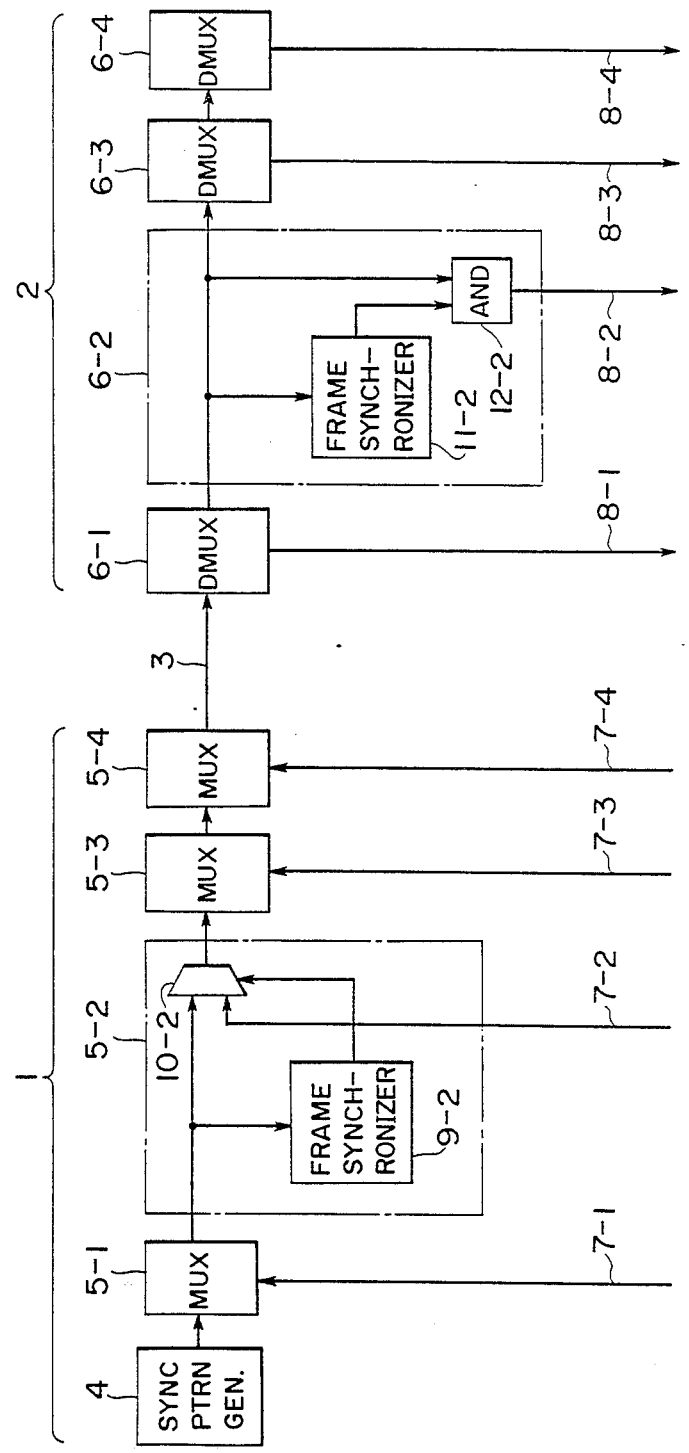
FIG. 1 is a block diagram of a multiplexer/demultiplexer of the present invention.

Referring now to FIG. 1, there is shown a system of a multiplexer stage 1 and a demultiplexer stage 2 interconnected by a transmission channel 3. Multiplexer stage 1 comprises a sync pattern generator 4 and a plurality of multiplexers 5-$k$ (where k ranges from unity to a value equal to the number of sync patterns contained in a multiframe) of identical construction which are cascaded from the sync pattern generator 4 to the transmit end of channel 3 and respectively connected to data inputs 7-$k$. Demultiplexer 2 comprises a plurality of sub-demultiplexers 6-$k$ of identical construction which are cascaded from the receive end of channel 3 and connected to data outputs 8-$k$, respectively.

Figure 2:
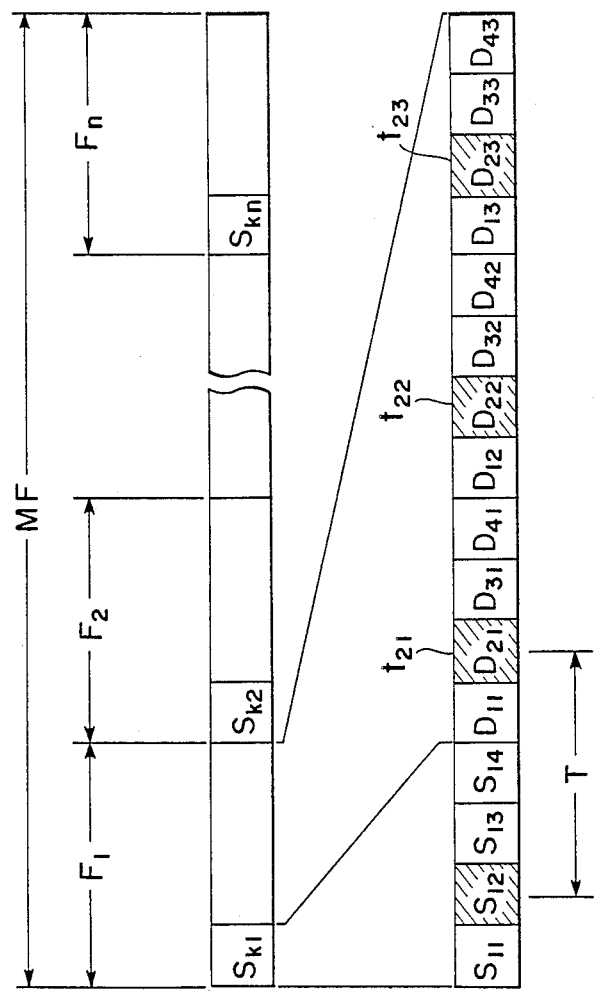
FIG. 2 is an illustration of the format of a data frame used in the embodiment of FIG. 1.

As illustrated in FIG. 2, the sync pattern generator 4 generates a consecutive series of unique frame patterns Skj at the beginning of each frame Fj (where j ranges from unity to an integer n representing the maximum number of frames in a multiframe MF) with the frame patterns Skj being assigned uniquely to the input data bits Dki (where i ranges from unity to a value equal to the number of slots for data bits Dk contained in each frame). Each of the multiplexers 5-$k$ is made up of a frame synchronizer 9-$k$ and a gate circuit 10-$k$. Each of the gate circuits 10-$k$ has one input connected from the output of the gate circuit of preceding multiplexer in the cascade connection and a second input connected to the respective data input 7-$k$, with the first input of the gate circuit 7-1 being connected to the sync pattern generator and the output of the gate circuit 7-4 being connected to the transmit end of channel 3. Sync patterns Sik are uniquely assigned to frame synchronizers 9-$i$, respectively. Thus, sync patterns S2j are assigned uniquely to frame synchronizer 9-2. Each frame synchronizer 9-$k$ compares each of the unique sync patterns Skj with the frame patterns contained in a data bit stream supplied from the preceding multiplexer and detects a match. When this occurs, frame synchronizer 9-$k$ supplies a series of slot timing pulses at intervals T to the control terminal of gate circuit 10-$k$ to allow data bits Dki to be passed through it to the gate circuit of the next multiplexer 5-($k$+1). Thus, data bits D2i on data input 7-2 are multiplexed into time slots $t_{21}$, $t_{22}$ and $t_{23}$ by the multiplexer 9-2. In this way, sync patterns Skj from sync pattern generator 4 are passed from one multiplexer to the next and data bits Dki of each data input 7-$k$ are multiplexed into time slots uniquely determined by the frame synchronizer of each multiplexer and passed on to the next multiplexer.

Each of the demultiplexers 6-$k$ comprises a frame synchronizer 11-$k$ and an AND gate 12-$k$. Similar to the frame synchronizers 9-$k$ of multiplexer stage 1, the frame sync patterns Skj are assigned uniquely to the frame synchronizers 11-$k$. Each frame synchronizer 11-$k$ compares the uniquely assigned frame sync patterns Skj with the corresponding frame sync patterns contained in the bit stream supplied from the multiplexer stage 1 and detects a match. Upon detection of a match, frame synchronizer 11-$k$ supplies a series of slot timing pulses at intervals T to the AND gate 12-$k$ to allow data bits Dki to be passed through it to output terminal 8-$k$. Data bits D21, D22 and D23 are thus separated from the incoming data bit stream by the demultiplexer 11-2 and fed to data output 8-2.

It is seen that data bits D1i, D2i, D3i and D4i from data inputs 7-1, 7-2, 7-3 and 7-4 are multiplexed respectively by the associated multiplexers 9-1, 9-2, 9-3 and 9-4 into a single bit stream and demultiplexed respectively into separate components by the associated demultiplexers 11-1, 11-2, 11-3 and 11-4 and supplied to data outputs 8-1, 8-2, 8-3 and 8-4. Because of the simplified construction, each of the multiplexers 5-$k$ and demultiplexers 6-$k$ can be individually implemented by a high-speed LSI chip with a low level of integration.

Figure 3:
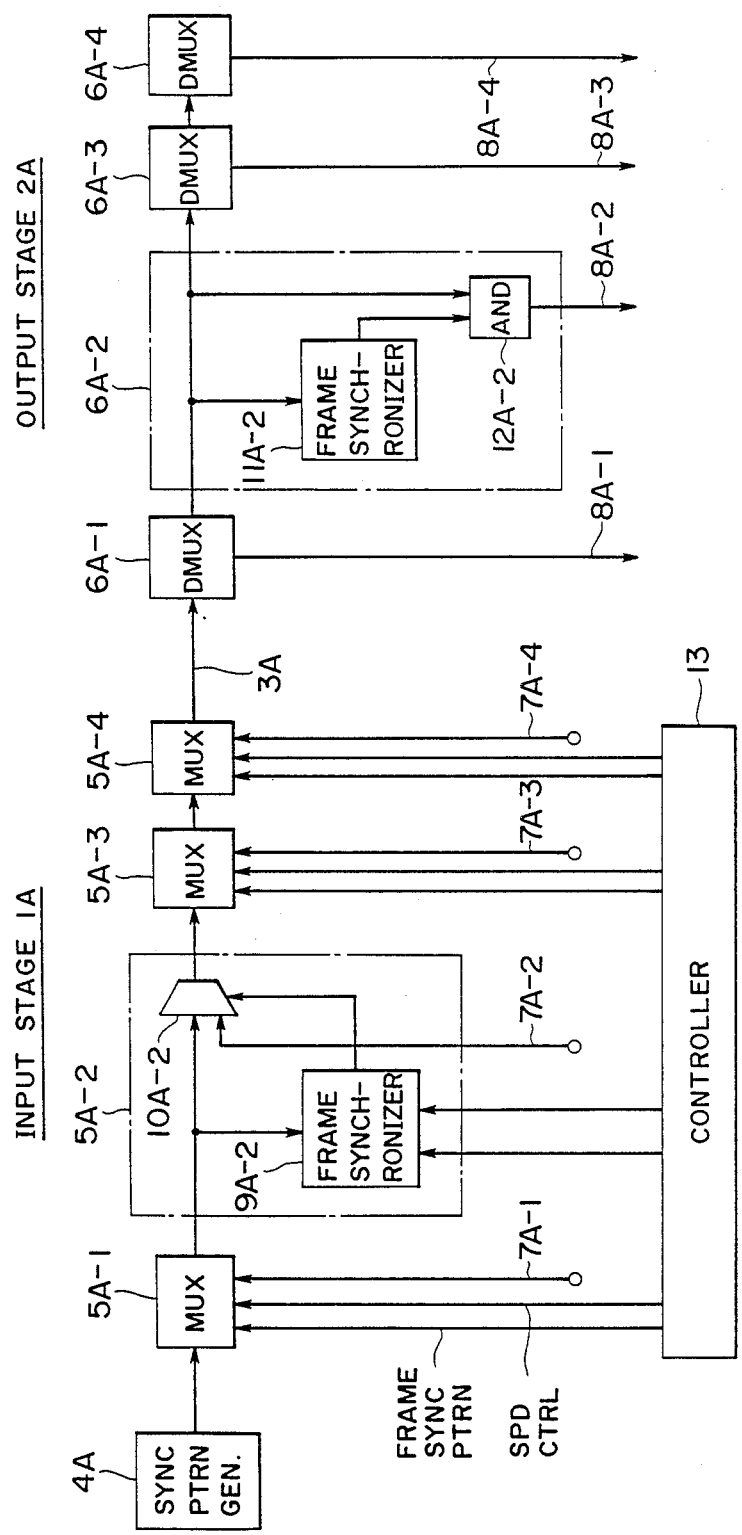
FIG. 3 is a block diagram of a switching network for a time division switching system incorporating the embodiment of FIG. 1.

The embodiment of FIG. 1 is modified as shown in FIG. 3 to implement a switching network for a time division switching system. The switching network comprises a frame sync pattern generator 4A identical to the sync pattern generator 4 of FIG. 1, an input stage 1A connected to the sync pattern generator 4A and an output stage 2A connected to the input stage 1A by a link 3A. Input stage 1A comprises a plurality of cascaded LSI multiplexers 5A-$k$ each including a frame synchronizer 9A-$k$ and a gate circuit 10A-$k$. Frame synchronizer 9A-$k$ compares each of the sync patterns Skj supplied from the sync generator 4A with a frame sync pattern supplied from a controller 13 to detect a match and generates a series of slot timing pulses at intervals T to the control terminal of gate circuit 10A-$k$. In the absence of the slot timing pulses, the output of each preceding multiplexer is passed through the multiplexer 5A-$k$ to the next and in the presence of the slot timing pulses data bits Dki, which are supplied on input line 7A-$k$, are passed to the next multiplexer. In this way, sync patterns Skj from sync generator 4A are passed from one multiplexer to the next and data bits Dji are multiplexed into time slots uniquely associated with the sync pattern supplied from the controller 13.

Output stage 2A comprises a plurality of LSI demultiplexers 6A-$k$ which are connected to channel 3A and to which frame sync patterns Skj are respectively assigned. Each demultiplexer 6A-k comprises a frame synchronizer 11A-$k$ and an AND gate 12A-$k$. Frame synchronizer 11A-$k$ compares the sync pattern Skj uniquely assigned to it with each of the sync patterns Skj from the input stage 1A to enable the AND gate 12A-$k$ at intervals T to pass desired data bits to an output line 8A-$k$ when a coincidence is detected by frame synchronizer 11A-$k$.

Assume that data bits on input line 7A-2 are to be switched to output line 8A-2, controller 13 supplies a sync pattern S2j to frame synchronizer 9A-2 so that data bits from input line 7A-2 are multiplexed into time slots $t_{21}$, $t_{22}$ and $t_{23}$ (FIG. 2). Frame synchronizer 11A-2 detects the assigned sync pattern S2j in the incoming sync patterns and the multiplexed data bits are passed to output line 8A-2. It will be seen that instead of applying sync patterns to the input stage 1A the embodiment of FIG. 3 can be modified to apply sync patterns from the controller 13 to the frame synchronizers of output stage 2A by uniquely assigning sync patterns Sjk respectively to the multiplexers of input stage 1A.

Figure 4:
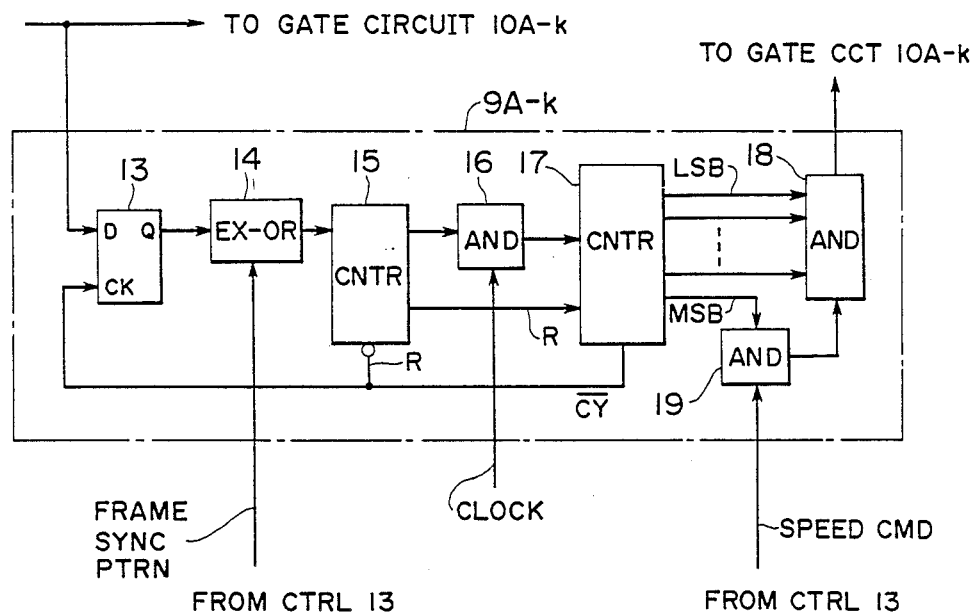
FIG. 4 is a circuit diagram of the detail of each frame synchronizer of FIG. 3.

Details of the frame synchronizers 9A and 9B are shown in FIG. 4. The synchronizer comprises a D flip-flop 13 having a D input coupled to the output of the preceding multiplexer and a clock input connected from the carry output of a counter 17. The output of D flip-flop 13 is connected to an exclusive-OR gate 14 to which the frame sync pattern is supplied in serial form from the control circuit 13. The output of exclusive-OR gate 15 is applied to a 2-bit counter 15. Counter 15 enables an AND gate 16 if it receives a pulse from the exclusive-OR gate 14 and disables it when it receives the next pulse. When enabled, AND gate 16 allows clock pulses from a clock source, not shown, to be supplied to the counter 17. The binary outputs of counter 17 are connected to an AND gate 18 with the exception that the most significant bit is coupled by way of an AND gate 19 to which a speed control signal is applied from the control circuit 13.

The synchronizer operates as follows. Initially, the carry output of counter 17 is at logic zero and hence the output of D flip-flop 13 is low. When a series of frame sync pulses is supplied from the control circuit 13 to the exclusive-OR gate 14, it switches to a logical one and causes the output of counter 15 to enable the AND gate 16 to supply clock pulses to the counter 17. The carry output goes high, allowing the D flip-flop 13 to pass signals on the highway to the exclusive-OR gate 14. If the output of D flip-flop 13 matches the sync pattern from control circuit 13, exclusive-OR gate 14 produces a logical zero output. When a mismatch occurs, an additional pulse will be supplied to counter 15 to disable the AND gate 16 as an indication of an out-of-frame sync, removing a clock pulse from the input of the counter 17. If there is a match between the whole bits of the sync pattern and the pulse input from the highway, exclusive-OR gate 14 remains in the logical-zero state. Counter 17 attains a predetermined count value when the whole bits of the sync pattern have been supplied to the synchronizer. The carry output of counter 17 goes low, preventing no further inputs from the highway from entering the exclusive-OR gate 14 and resetting the counter 15. The speed control command from control circuit 13 is at logical one during a low speed mode of operation, AND gate 19 is enabled and all the inputs of AND gate 18 are at logical one at the end of the frame sync pattern, providing a gate timing pulse to the gate circuit 10A-$k$ (10B-$k$) During a high speed mode of operation, the length of the sync pattern is reduced to one half as much and the speed control command is switched to logical zero, disabling AND gate 19. This causes AND gate 18 to produce a gate timing pulse at one half the intervals of the low speed mode.

Figure 5:
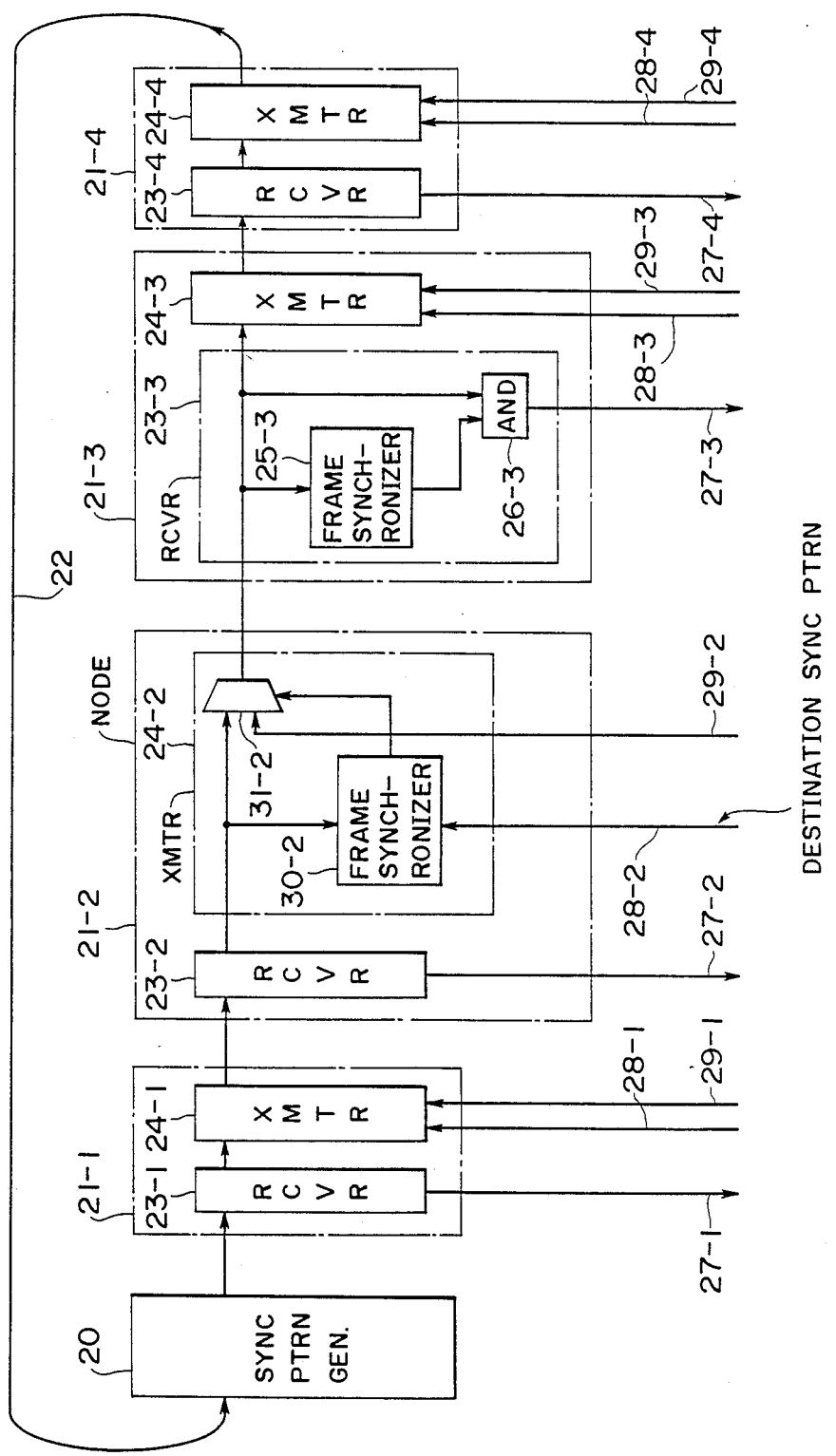
FIG. 5 is a block diagram of a local area network as a modification of the FIG. 1 embodiment.

The multiplexer/demultiplexer concept of the Fig. 1 embodiment can be advantageously incorporated into a local area network as shown in FIG. 5. This local area network comprises a frame sync generator 20 and a plurality of cascaded switching nodes 21-$k$ interconnected by a network loop 22. Each switching node is implemented by a high-speed LSI with a low level of integration. Frame sync generator 20 generates the same frame sync patterns as those shown in FIG. 2. Each switching node 21-$k$ includes a receiver 23-$k$ and a transmitter 24-$k$. Receiver 23-$k$ includes a frame synchronizer 25-$k$ and an AND gate 26-$k$. Similar to the previous embodiment, frame sync patterns Skj are respectively assigned to frame synchronizers 25-$k$. Synchronizers 25-$k$ detect a match with the corresponding frame sync patterns transmitted from the preceding node 21−($k$-1) and supplies a series of slot timing pulses at intervals T to AND gate 26-$k$ to allow data bits destined to the own node to be passed through gate 26-$k$ to data output 27-$k$. Transmitter 23-$k$ comprises a frame synchronizer 30-$k$ which is responsive to a destination sync pattern Sdj supplied from an address input 28-$k$. Frame synchronizer 30-$k$ compares the sync pattern Sdj with the sync patterns received from the preceding node 21−($k$-1) and detects a match. When this occurs, it supplies a series of slot timing pulses at intervals T to the control terminal of a gate circuit 31-$k$ to multiplex data bits Dki into the time slots which are uniquely assigned to the destination node.

Assume that switching takes place between nodes 21-2 and 21-3. Address input 28-2 supplies a sync pattern S3j to the frame synchronizer 30-2, so that frame synchronizer 30-2 detects a match with the sync pattern S3j generated by the sync generator 20 and data bits D2i are multiplexed by gate circuit 31-2 into the time slots of the destination node 21-3. Therefore, the transmitted data bits D2j are detected in the time slots of the node 21-3 and passed through AND gate 26-3 to data output 27-3. On the other hand, an address code S2j is supplied from input 28-3 to frame synchronizer 30-3 of transmitter 24-3 to multiplex data bits D3i into the time slots of the node 21-2 and forwarded onto the network loop 22. Frame synchronizer 25-2 of receiver 23-2 detects the inserted sync pattern S2j to pass data D3j to data output 27-2.

Figure 6:
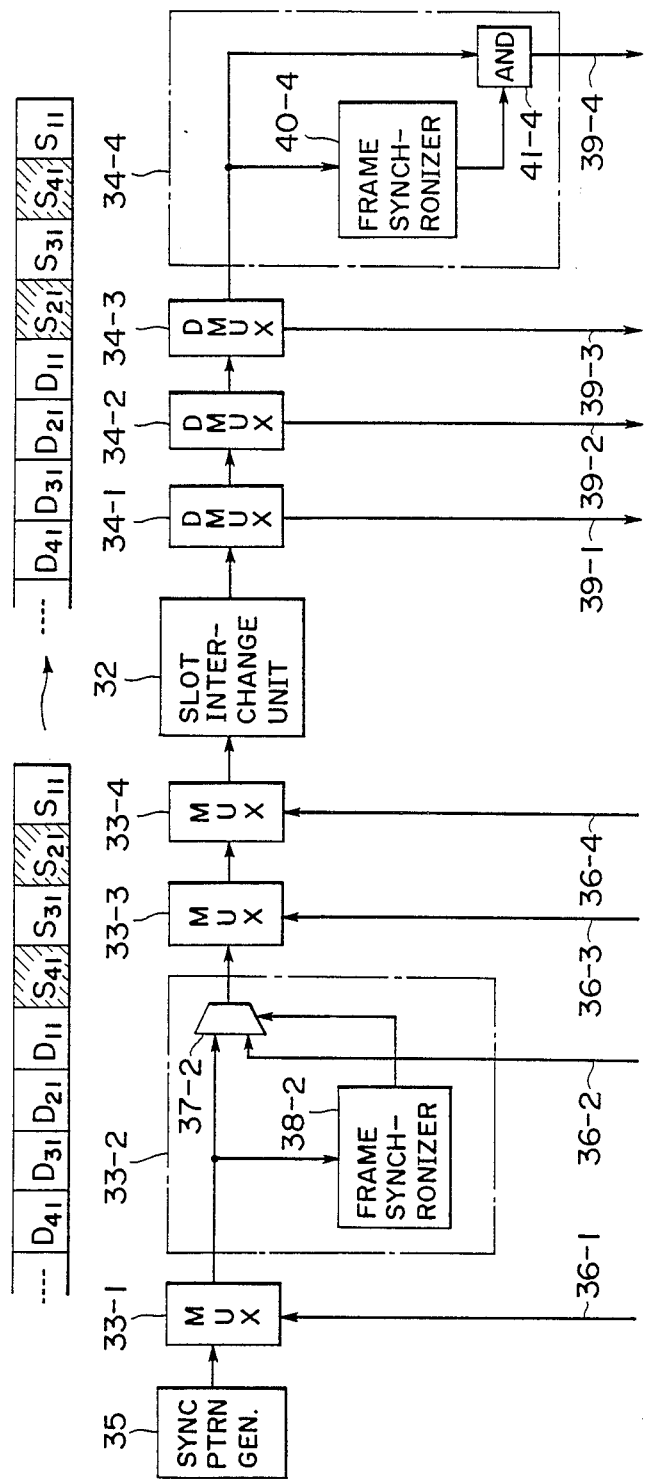
FIG. 6 is a block diagram of a modification of the switching network of FIG. 3.
Figure 7:
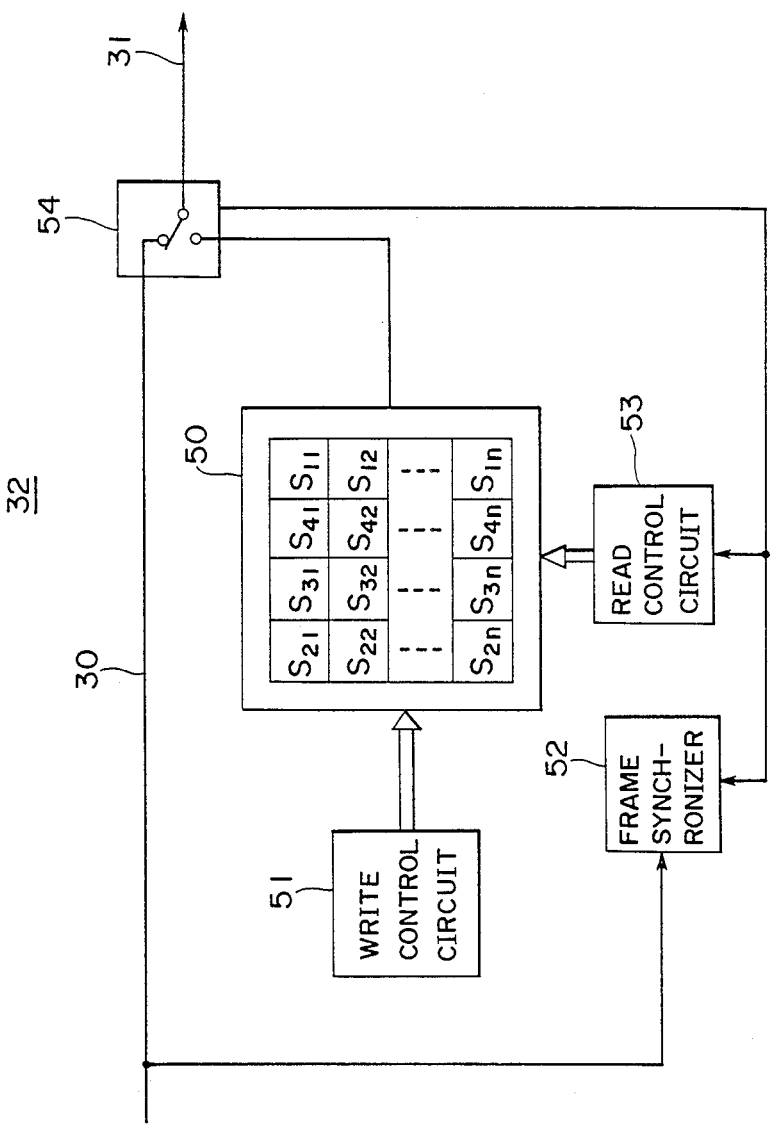
FIG. 7 is an illustration of details of the slot interchange unit of FIG. 6.

An embodiment shown in FIG. 6 is a combination of a slot interchange unit and the embodiment of FIG. 1 to implement a switching network for time division switching systems. The switching network comprises a multiplexer stage connected in an inlet highway 30 and a demultiplexer stage connected in an outlet highway 31, the inlet and outlet highways being connected by a sync slot interchange unit 32. The inlet highway 30 is interposed by a plurality of multiplexers 33-$k$ and the outlet highway 31 is interposed by a plurality of demultiplexers 34-$k$. A frame sync pattern generator 35 is connected to inlet highway 30 to supply a series of frame sync patterns Skj at periodic intervals. Each multiplexer 33-$k$ has an input line 36-$k$ connected to a gate circuit 37-$k$ to which the output of preceding multiplexer 33−($k$-1) is connected. Each multiplexer 33-2 includes a frame synchronizer 38-$k$ to which the sync pattern Skj is assigned. Frame synchronizer 38-$k$ detects a match between the assigned sync patterns and those generated by the sync pattern generator 35 as in the previous embodiments and supplies a series of slot timing pulses at intervals T to the control terminal of gate circuit 37-$k$, so that data bits Dki from input line 36-$k$ are multiplexed into the time slots assigned to the multiplexer 33-$k$. As will be described hereinbelow, the sync pattern assigned to a given input line is switched to the time slot of a desired output line 39-$k$ by the slot interchange unit 32 and supplied to the outlet highway 31. Each demultiplexer 34-$k$ comprises a frame synchronizer 40-$k$ and an AND gate 41-$k$. Frame synchronizer 39-$k$ compares sync patterns Skj with the corresponding sync patterns travelling through the outlet highway 31 to detect a match. In response to the detection of a match, a series of slot timing pulses is supplied at intervals T from the synchronizer 40-$k$ to the AND gate 41-$k$ to demultiplex the received data bits for application to output line 39-$k$. Referring to FIG. 7, the slot interchange unit 32 comprises a control memory 50 which normally stores sync patterns in a predetermined order in a matrix array. A write control circuit 51 transposes the stored sync patterns in accordance with switching control signals. Assume that data bits on input lines 36-2 and 36-4 are to be switched to output lines 39-2 and 39-4, respectively, and data bits on input lines 36-1 and 36-3 are to be switched to output lines 39-1 and 39-3, respectively. Write control circuit 51 transposes sync patterns S4j and S2j on each row of the matrix. A frame synchronizer 52 is connected to the inlet highway 30 to detect the sync patterns Skj and generates a timing signal. A read control circuit 53 is associated with the control memory 50 to sequentially read out the contents of the memory starting with the rightmost column of the first row in response to a timing signal generated by synchronizer 52 in response to a series of sync patterns S11, S21, S31 and S41 supplied from inlet highway 30. Read control circuit 53 shifts the read address to the next row in response to the arrival of a second series of sync patterns S21, S22, S23 and S24. The timing signal from frame synchronizer 52 is also supplied to the control terminal of a switch 54. The output end of inlet highway 30 and the output of control memory 50 are connected to the inputs of switch 54. In the absence of timing signal from frame synchronizer 52, sync patterns on inlet highway 30 are applied to the outlet highway 31 and in response to the presence of a timing signal from synchronizer 52 the output of control memory 50 is coupled to the outlet highway 31 to replace the original sync patterns generated by sync pattern generator 35 with the rearranged sync patterns.

With the sync patterns being rearranged on the outlet highway 31, demultiplexer 34-4 is synchronized with the transposed sync pattern S4j to pass data bits D2i to output line 39-4 and demultiplexer 34-2 is synchronized with the transposed sync pattern S2j to pass data bits D4i to output line 39-2.

Figure 8:
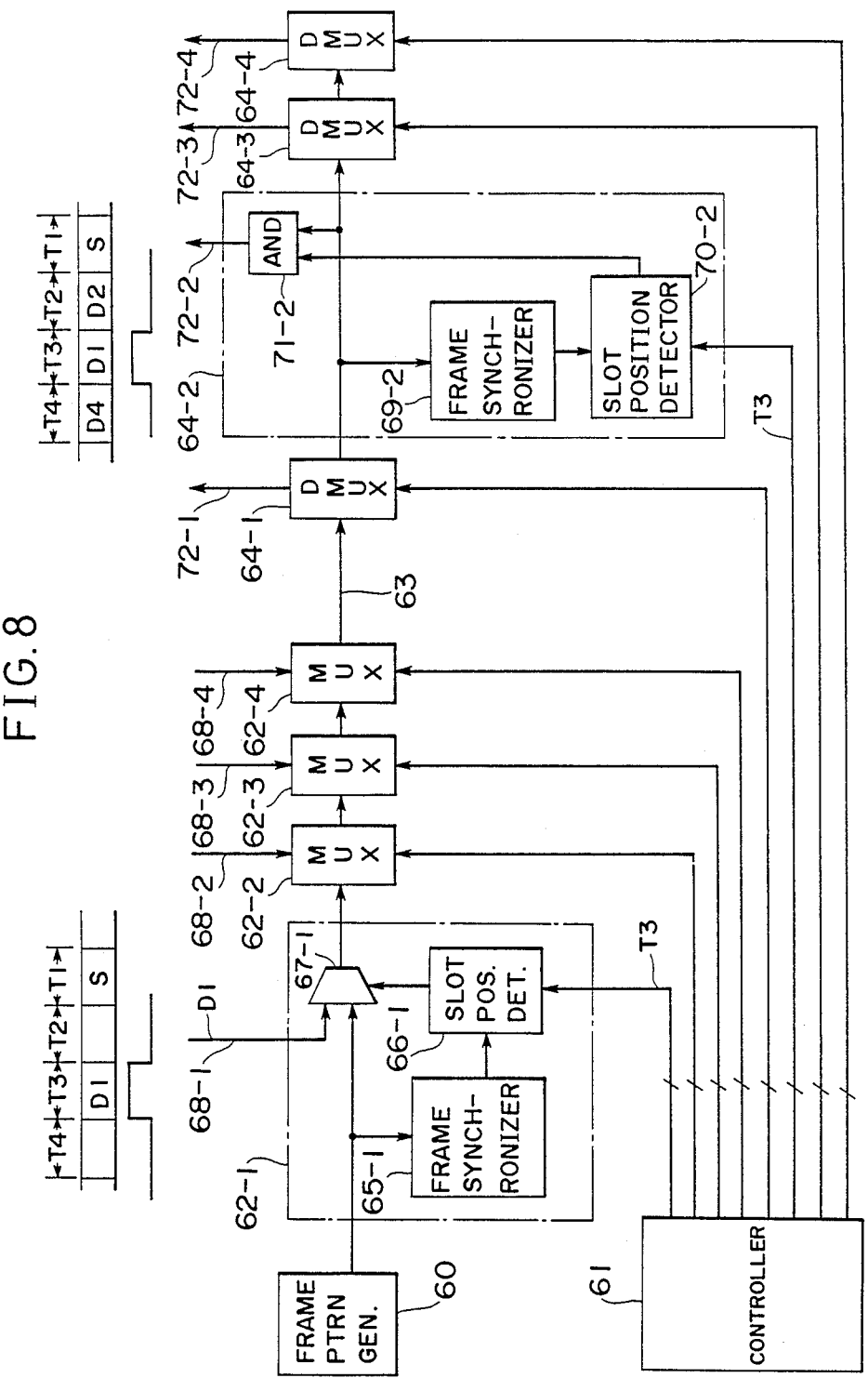
FIG. 8 is a block diagram of a modification of the switching network of FIG. 3.

A modification of the time switch of FIG. 6 is shown in FIG. 8. In the modified time switch, a frame sync pattern generator 60 generates a single frame pattern S instead of multiple patterns and a switching control unit 61 generates a slot position indicating code. The time switch is essentially of a multiplexer/demultiplexer configuration as in the FIG. 6 embodiment. The multiplexer stage of the time switch comprises multiplexers 61-$k$ cascaded in a highway 63 and the demultiplexer stage comprises demultiplexers 64-$k$ cascaded in the highway 63. Each multiplexer 62$k$ includes a frame synchronizer 65-$k$ a slot position detector 66-$k$ and a gate circuit 67-$k$. Frame synchronizer 65-$k$ responds to the single frame pattern S by supplying a timing pulse to a first input of the slot position detector 66-$k$. Switching control circuit 61 supplies a slot position indicating code to the second input of time slot position detector 66-$k$. In response to it, slot position detector 66-$k$ specifies the position of a time slot with respect to the sync pattern S and supplies a timing signal to gate circuit 67-$k$ in a manner as will be described later. In the absence of the timing signal, a multiplexed data bit stream is passed through gate circuit 67-$k$ to the next multiplexer and in the presence of timing signal, data bits from an input line 68-$k$ are multiplexed into the specified time slot of the bit stream and forwarded onto the highway 63.

Each of the demultiplexers 64-$k$ comprises a frame synchronizer 69-$k$, a slot position detector 70-$k$ and an AND gate 71-$k$. Synchronizer 69-$k$ supplies a timing signal to the slot position detector 70-$k$ when it detects the sync pattern S of the bit stream propagating through the highway 63. Slot position detector 70-$k$, which is of identical construction to the slot position detector 66-$k$, receives the same slot position indicating code as supplied to slot position detector 66-$k$ and specifies the position of a time slot with respect to the sync pattern S and opens the AND gate 71-$k$ to demultiplex the data bits in that time slot for application to an output line 72-$k$. It will be seen that time slot interchange occurs between a multiplexer 62 and a demultiplexer 64 of a desired set by applying the same control code to the slot position detectors 66-$k$ and 70-$k$ from the control circuit 61.

Figure 9:
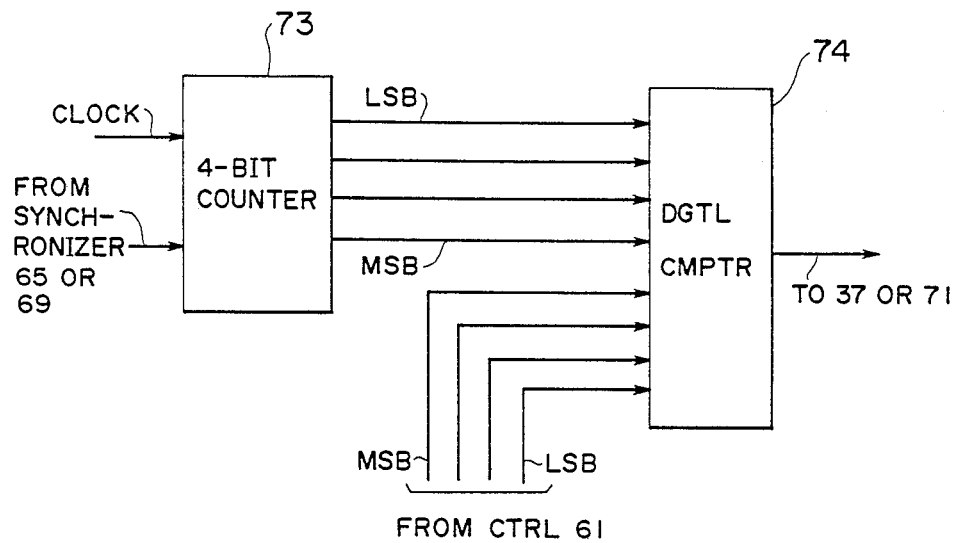
FIGS. 9 and 10 are illustrations of details of the slot position detectors of FIG. 8.
Figure 10:
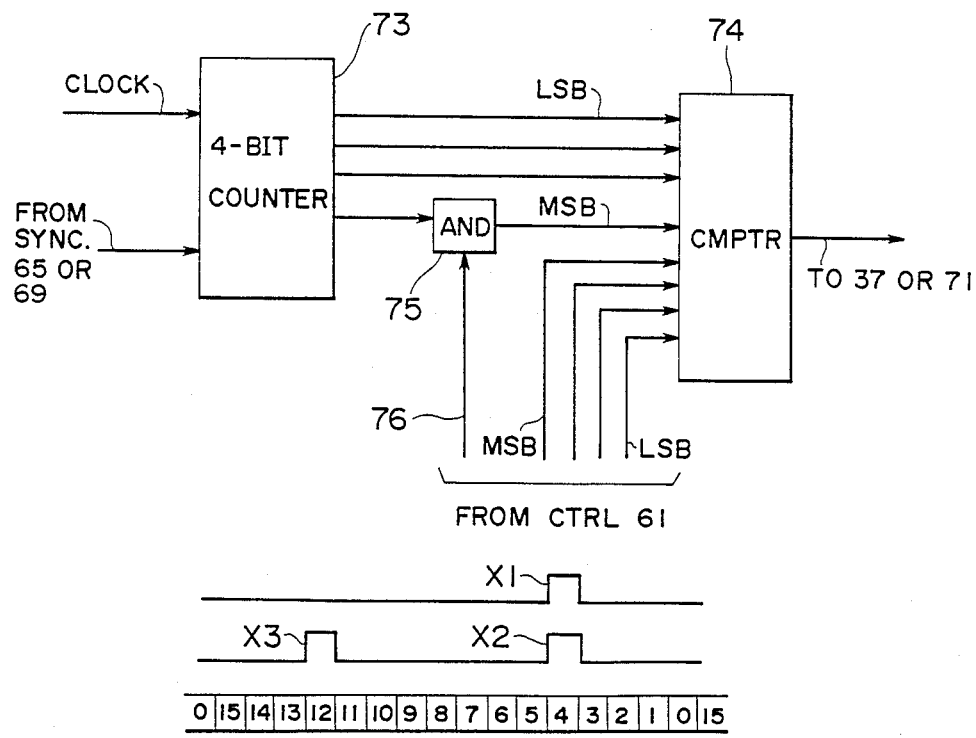

Details of slot position detectors 66-$k$ and 70-$k$ for a 16-time slot frame format are shown in FIG. 9. Each slot position detector comprises a 4-bit counter 73 and a digital comparator 74. Counter 73 increments its count in response to a slot timing pulse, initiates counting in response to a timing pulse from the associated frame synchronizer 65 or 69 and supplies a 4-bit count word to the digital comparator 74. The switching control code from control circuit 61 is of a 4-bit word which is applied to the comparator 74 for comparison with the 4-bit count value. A coincidence pulse is generated from comparator 74 when the 4-bit count value becomes equal to the 4-bit control code as an indication of the timing at which the desired data bits are to be extracted.

Returning to FIG. 8, if it is desired to switch data bits from input line 68-1 to output line 72-1, the control circuit 61 selects an idle time slot, say, T3 and supplies the digital comparators 74 of slot position detectors 66-1 and 70-2 with a 4-bit control code "0010" indicating that the selected time slot T3 is displaced two time slots with respect to the time slot T1 in which sync pattern S is inserted. When two slot-timing pulses are counted by counter 73, a coincidence pulse is supplied from comparator 74 of slot position detector 66-1 to gate circuit 67-1 and data bits D1 from input line 68-1 are multiplexed into time slot T3 of the bit stream and forwarded through highway 63 to demultiplexer 64-2. Since the same "0010" code is supplied to the slot position detector 70-2, an equality pulse is generated from its comparator 74 exactly in time coincidence with the time slot T3, so that data bits D1 are admitted through AND gate 71-2 to output line 72-2.

The switching speed of the time switch of FIG. 9 can be advantageously doubled by including an AND gate 75 to the slot position detectors 66 and 70 as shown in FIG. 9. The most significant bit position of counter 73 is connected to one input of AND gate 75, the second input of AND gate 75 being connected to a dual mode port 76. Controller 61 applies a ONE to port 76 when the system operates in a low switching speed and applies a ZERO when it operates in a high switching speed. If time slot T4 is to be selected during a low speed mode, switching control bits "0100" are applied to ports B3 to B0, respectively, with a ONE being applied to dual mode port 76. Comparator 74 produces an equality pulse X1 when the counter 73 produces "0100" coincident with time slot T4. If time slots T4 and T12 are to be selected during a high speed mode, the same switching control bits "0100" are applied to ports B3 to B0 with a ZERO being applied to dual mode port 76. Comparator 74 produces an equality pulse X2 when counter 73 reaches "0100" coincident with time slot T4 and produces an equality pulse X3 when it reaches "1100" coincident with time slot T12.

Figure 11:
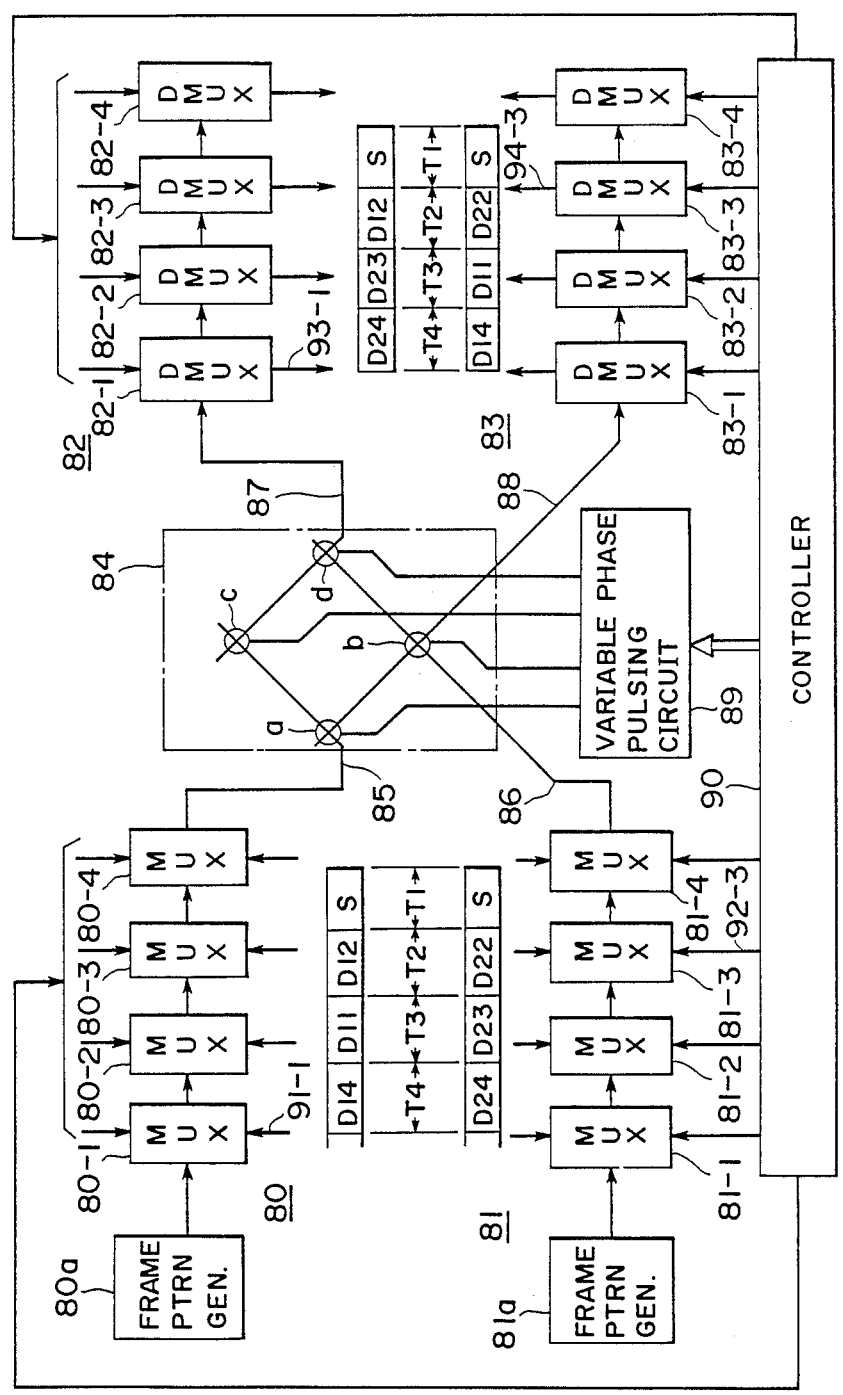
FIG. 11 is a block diagram of a time and space matrix of the present invention.

The time switch of FIG. 8 can be advantageously integrated with a space switch to form a combined time space switching matrix as shown in FIG. 11. This time space switching matrix generally comprises first and second multiplexer stages 80 and 81 and first and second demultiplexer stages 82 and 83. A space switch 84 provides interconnections between multiplexer stages 80 and 81 on the one hand and demultiplexer stages 82 and 83 on the other. Each of the multiplexer stages 80 and 81 is identical to the multiplexer stage of FIG. 7 and, likewise each of the demultiplexer stages 82 and 83 is identical to the demultiplexer stage of FIG. 8. Multiplexer stages 80 and 81 are connected to the space switch 84 via inlet highways 85 and 86, respectively, and demultiplexer stages 82 and 83 are connected to outlet highways 87 and 88, respectively. Inlet highways 85 and 86 are selectively switched to outlet highways 87 and 88 when crosspoints a, b, c and d are selectively operated in response to switching signals from a variable phase pulsing circuit 89. Pulsing circuit 89 is responsive to a control signal from switching controller 90 to generate a switching pulse to any of the crosspoints of space switch 84 in time coincidence with the time slot of desired data bits on any of the inlet highways 85 and 86. Therefore, data bits D11 on inlet highway 85 from an input line 91-1 can be switched to an output line 94-3 by applying a "0010" code to multiplexer 80-1 and demultiplexer 83-3, for example, from controller 90 and applying a switching pulse to crosspoint a from pulsing circuit 89 in coincidence with time slot T3. At the same time, a data packet D24 on inlet highway 86 from an input line 92-3 can be switched through outlet highway 87 to an output line 93-1 by applying a "0100" code to multiplexer 81-3 and demultiplexer 82-1, for example, from controller 90 and applying a switching with pulse to crosspoint d from pulsing circuit 89 in coincidence with time slot T4.

Figure 12:
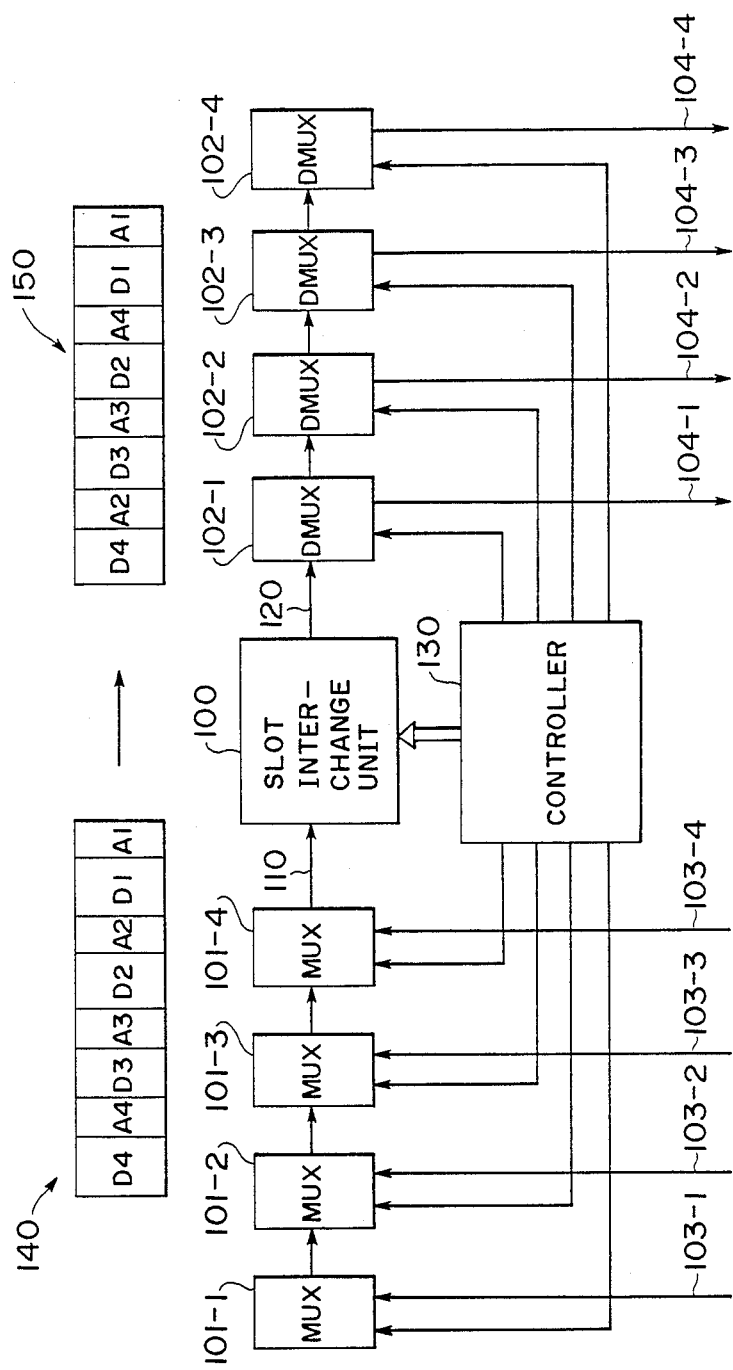
FIG. 12 is a block diagram of a time switch of a time division switching system according to a second embodiment of the invention.

FIG. 12 is a further modification of the time switch of FIG. 6. The multiplexer stage of the time switch comprises multiplexers 101-$k$ connected in an inlet highway 110 and the demultiplexer stage comprises demultiplexers 102-$k$ connected in an outlet highway 120 which is connected to the inlet highway 110 by a time slot interchange unit 100. A controller 130 supplies unique addresses A$k$ to the multiplexers 101-$k$ and demultiplexers 102-$k$ respectively. Each multiplexer 101-$k$ multiplexes the unique address A$k$ with data bits D$k$ from input line 103-$k$ into predetermined time slots of a frame. Each demultiplexer 102-$k$ compares the unique address A$k$ supplied from the controller with each of the multiplexed addresses to detect a match and demultiplexes the data bits identified by the matched address for delivery to an output line 104-$k$.

Figure 13:
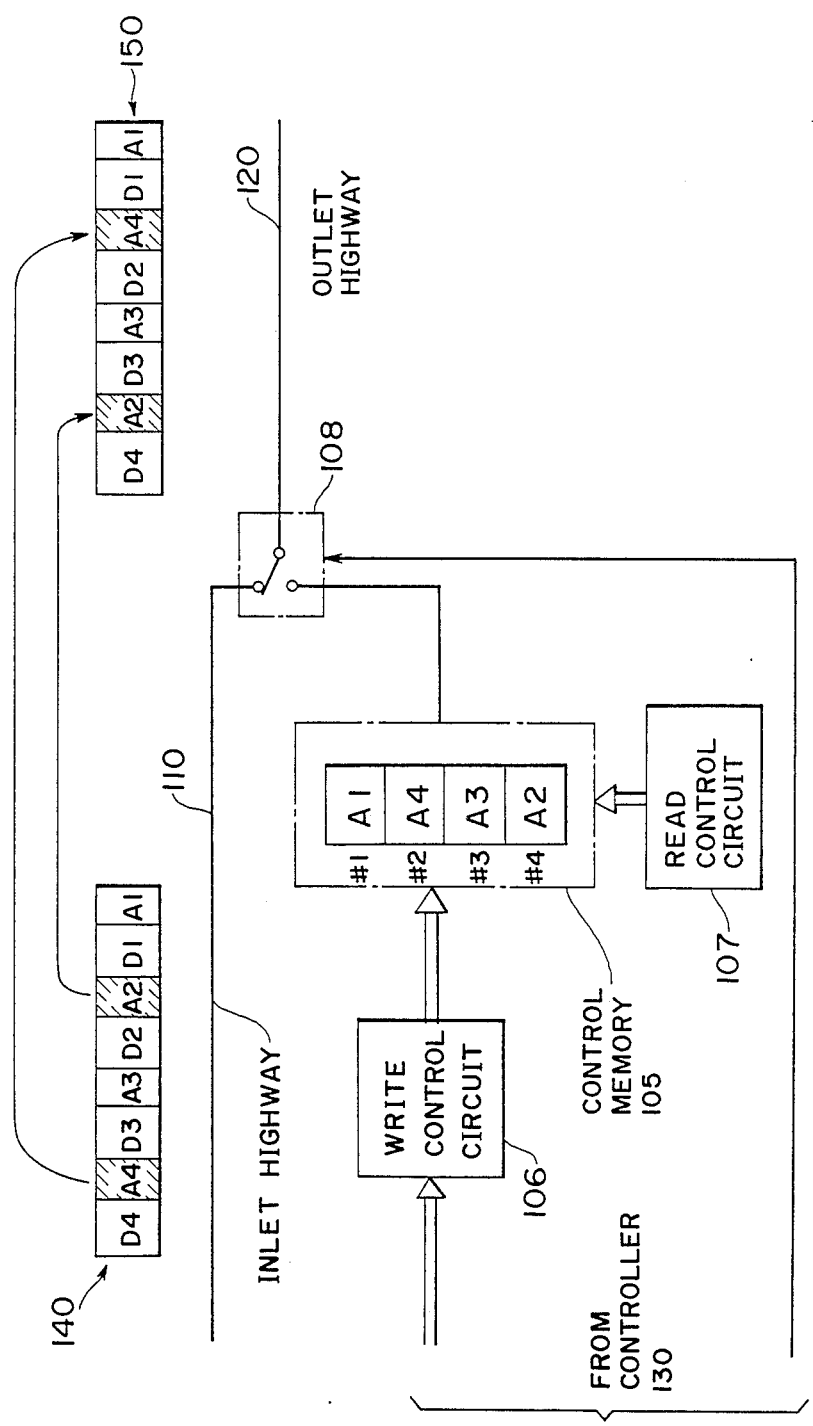
FIG. 13 is an illustration of details of the slot interchange unit of FIG. 12.

As shown in FIG. 13, the slot interchange unit 100 comprises a control memory 105, a write control circuit 106, a read control circuit 107 and a slot selector 108. Control memory 105 stores addresses A$k$. Write control circuit 106 is controlled in response to a switching control signal from controller 130 to transpose the stored addresses in a manner similar to that described with reference to FIG. 6. Read control circuit 107 provides read access to the control memory 105 in a sequential order at address timing. Slot selector 108 provides direct connection between the inlet and outlet highways 110 and 120 in the absence of timing pulses from controller 130 and switches its input to the output of control memory 105 in response to slot timing pulses so that the addresses A1 to A4 multiplexed on the inlet highway 110 as shown at 140 are replaced with the transposed addresses as shown at 150. In the illustrated example, addresses A2 and A4 are transposed and hence data bits D2 and D4, which are identified by addresses A2 and A4 respectively on the inlet highway 110, are identified by addresses A4 and A2 respectively on the outlet highway 120. Due to the slot interchange, data bits D4 and D2 are detected by demultiplexers 102-2 and 102-4 respectively, while data bits D1 and D3 are detected by demultiplexers 102-1 and 102-3, respectively.

Figure 15:
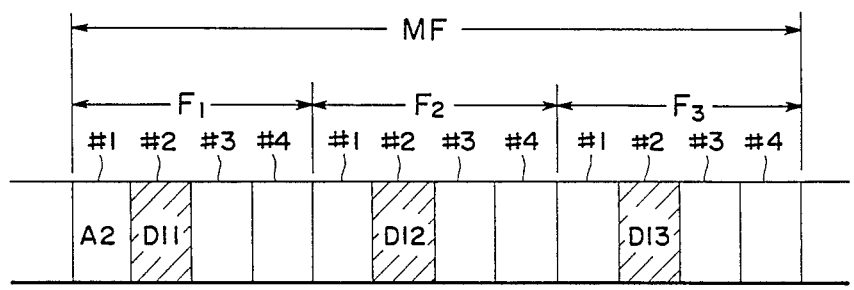
FIG. 15 is an illustration of a data format used in the local area network of FIG. 14.
Figure 14:
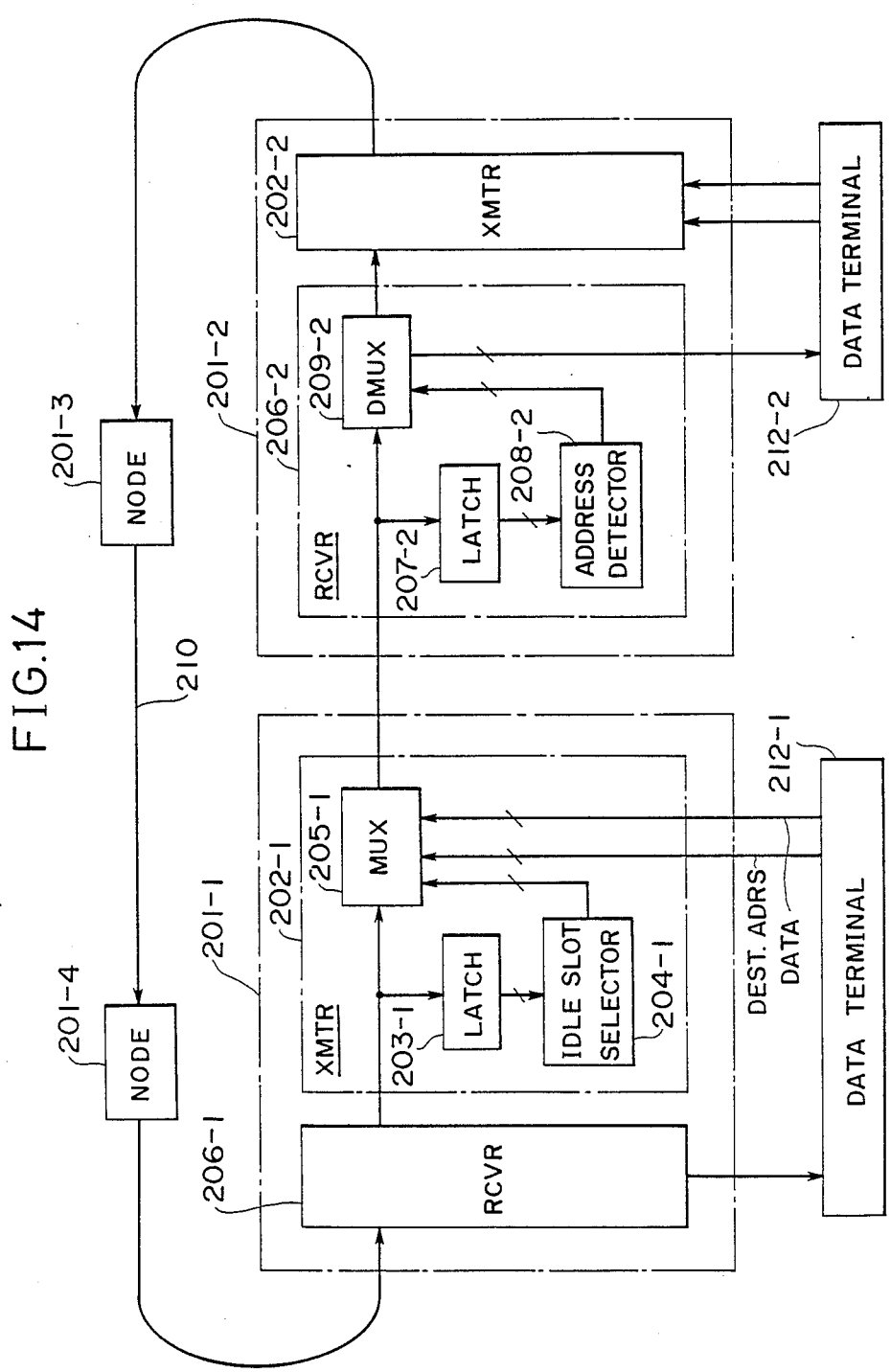
FIG. 14 is a block diagram of a local area network of the invention.

FIG. 14 is a modification of the local area network of FIG. 5. In this modification, the transmitter 202-$k$ of each switching node 201-$k$ comprises a latch 203-$k$, an idle slot selector 204-$k$ and a multiplexer 205-$k$. Multiplexer 205-$k$ essentially comprises a memory and a memory write control circuit. The output of multiplexer 205-$k$ is connected through a section of a network loop 210 to the input of demultiplexer 209-($k$+1) and the output of the demultiplexer 209-$k$ is connected to the input of the multiplexer 205-$k$. As shown in FIG. 15, the network generates a multiframe comprising n frames each comprising (n+1) time slots. The #1 time slot of each frame is used to carry the address of a destination node the other time slots are used to carry data packets. Latch 203-$k$ stores the whole length of a multiframe propagating through the network loop 210 to allow the idle slot selector 204-$k$ to select an idle address time slot from address time slots 211-1 through 211-3. In response to the selection of an idle time slot, it supplies a binary code to the multiplexer 205-$k$ representing the positions of the selected address time slot and a set of data slots into which data packets are to be multiplexed. The address slot of #n frame of a each multiframe is associated with a set of #(n+1) time slots of each frame of that multiframe. If the idle slot selector 204-$k$ selects the address slot of #n frame, it specifies #(n+1) time slots of each frame and generates a binary code indicating the selected address time slot #1 of frame Fn and the specified data time slots #(n+1) of frames F1 through Fn. The slot position indicating binary code is applied to the multiplexer 205-$k$ where the address of a destination node and data packets are received from the associated data terminal 212-$k$ and respectively multiplexed into the selected address time slot and the specified data time slots.

The receiver 206-$k$ of each node comprises a latch 207-$k$, an address detector 208-$k$ and a demultiplexer 209-$k$. Unique address A$k$ is assigned to the address detector 208-$k$. Latch 207-$k$ stores the whole length of each multiframe to allow the address detector 208-$k$ to detect a match between the assigned unique address A$k$ and the destination address and supplies a slot position binary code to the demultiplexer 209-$k$ to demultiplex data packets directed to the destination node.

If data terminal 212-1 wishes to communicate with data terminal 212-2, it generates a destination address A2. If all the address time slots are idle, the address time slot #1 of frame F1 will be selected and the destination address A2 is multiplexed into the selected address time slot and data packets D11, D12 and D13 from source terminal 212-1 are respectively multiplexed into data slots #2 of frames F1, F2 and F3. The multiplexed address A2 is detected by address detector 208-2 of the destination node 201-2 and a slot indicating binary code is supplied to the demultiplexer 209-2, which demultiplexes the data packets D11, D12 and D13 from the network loop 210 into the associated data terminal 212-2.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A multiplexer/demultiplexer comprising:
   a sync pattern generator for generating a series of unique sync pattern, at periodic intervals;
   a cascaded plurality of multiplexers serially connected at one of their ends to said sync pattern generator and serially connected at the other of their ends to one end of a channel, each of said multiplexers detecting a particular one of said unique sync patterns and multiplexing input data packets into time slots which are uniquely identified by said particular sync pattern, forming a data bit stream with said sync patterns and forwarding the data bit stream to said channel; and a plurality of demultiplexers serially connected to the opposite end of said channel, each of said demultiplexers detecting a particular one of said sync patterns form said forwarded data bit stream and for extracting data packets from the time slots uniquely identified by the last mentioned particular sync pattern.

2. A time division switching system comprising:

a sync pattern generator for generating a series of unique sync patterns at periodic intervals;

a cascaded plurality of multiplexers serially connected at one of their ends to said sync pattern generator and serially connected at the other of their ends to one end of a channel, each of said multiplexers detecting one of said sync patterns, multiplexing input data packets into time slots uniquely identified by said detected sync pattern, forming a data bit stream with said sync patterns and forwarding the data bit stream to said channel;

a cascaded plurality of demultiplexers serially connected at one of their ends to the opposite end of said channel, each of said demultiplexers detecting one of said sync patterns in said forwarded data bit stream and extracting data packets from the time slots uniquely identified by the detected sync pattern; and control means for determining one of said unique sync patterns and causing either of said each multiplexer and said each demultiplexer to detect said one sync pattern in accordance with the determination.

3. A time division switching system as claimed in claim 2, wherein each of said multiplexers comprises:

a counter having a plurality of outputs for incrementing a count value in response to the detection of said sync pattern and for generating therefrom binary significant bit outputs;

first AND gate means having a first input connected to a most significant bit output of said counter and a second input responsive to a speed command signal, said first AND gate having an output;

second AND gate means having inputs connected to all of the outputs of said counter excepting said most significant bit output and to the output of said first AND gate means for generating a timing pulse; and gate means for multiplexing said input data packets with an output from a preceding multiplexer in response to said timing pulse.

4. A time division switching system comprising:

a sync pattern generator for supplying a series of unique sync patterns to one end of an inlet highway;

a cascaded plurality of multiplexers serially connected in said inlet highway, each of said multiplexers detecting a particular one of said unique sync patterns and multiplexing data packets into time slots identified uniquely by said particular sync pattern to form a data bit stream;

a cascaded plurality of demultiplexers serially connected in an outlet highway, each of said demultiplexers detecting a particular one of said unique sync patterns in said data bit stream and extracting data packets from time slots uniquely identified by the detected particular sync pattern; and a time slot interchanger connected between said inlet and outlet highways for transposing time slots of said unique sync patterns.

5. A time division switching system comprising:

a sync pattern generator for generating a sync pattern at frame intervals;

control means for generating a control signal indicative of the interval between a time slot and said sync pattern;

a cascaded plurality of multiplexers serially connected at one of their end to said sync pattern generator and serially connected at the other of their ends to one end of a channel, each of said multiplexers detecting said sync pattern and multiplexing input data packets into a time slot which is spaced from the detected sync pattern by an amount equal to the interval indicated by said control signal in order to form a data bit stream with said sync pattern; and a cascaded plurality of demultiplexers serially connected to the opposite end of said channel, each of said demultiplexers detecting said sync pattern in said data bit stream and extracting data packets from a time slot of the bit stream which is spaced from the detected sync pattern by an amount equal to the interval indicated by said control signal.

6. A time division switching system as claimed in claim 5, wherein said control signal is a binary code, and each of said multiplexer comprises:

a counter responsive to the detection of said sync pattern for incrementing a binary count value at time slot intervals;

a digital comparator for comparing said binary count value with said binary code for detecting a match therebetween to cause said data packets to be multiplexed into said time slot.

7. A time division switching system as claimed in claim 6, further comprising an AND gate having a first input responsive to a most significant bit position of said binary count value and a second input responsive to a most significant bit position of said binary code, the output of said AND gate being connected to said comparator as a most significant bit position of said binary count value.

8. A time division switching system as claimed in claim 5, wherein said control signal is a binary code, and each of said demultiplexer comprises:

a counter responsive to the detection of said sync pattern for incrementing a binary count value at time slot intervals;

a digital comparator for comparing said binary count value with said binary code for detecting a match therebetween to cause said data packets to be extracted from said time slot.

9. A time division switching system as claimed in claim 8, further comprising an AND gate having a first input responsive to a most significant bit position of said binary count value and a second input responsive to a most significant bit position of said binary code, the output of said AND gate being connected to said comparator as a most significant bit position of said binary count value.

10. A time division switching system comprising:

control means for generating a first control signal which is indicative of the interval between a time slot and a sync pattern and a second control signal which is indicative of said time slot;

a plurality of input stages, each of said input stages comprising a sync pattern generator for generating a sync pattern at frame intervals, and a plurality of multiplexers serially connected at one of their ends to said sync pattern generator and serially connected at the other of their ends to an inlet highway, each of said multiplexers detecting said sync pattern and multiplexing input data packets into said time slot in response to said first control signal in order to form a data bit stream with said sync pattern;

a plurality of output stages, each of said output stages comprising a plurality demultiplexers serially connected to an outlet highway, each of said demultiplexers detecting said sync pattern in said data bit stream and extracting data packets from a time slot of the bit stream in response to said first control signal; and space switch means for selectively coupling the inlet highways to the outlet highways in response to said second control signal.

11. A time division switching system comprising:

a cascaded plurality of multiplexers serially connected to an inlet highway, each of said multiplexers multiplexing input data packets and a particular address pattern into time slots uniquely identified by said particular address pattern to form a data bit stream and forwarding said data bit stream to said inlet highway;

a cascaded plurality of demultiplexers serially connected to an outlet highway, each of said demultiplexers detecting a particular one of said unique address patterns in said forwarded data bit stream and extracting data packets from a time slot uniquely identified by the detected address pattern; and a time slot interchanges connected between said inlet and outlet highways for transposing time slots of said unique address patterns.

12. A local area network having a plurality of nodes connected in a common network loop, comprising:

a code pattern generator connected in said network loop for generating a series of unique code patterns respectively assigned to said nodes, each of said nodes comprising:

transmit means for detecting one of said unique code patterns which is assigned to a destination node and multiplexing data packets of the own node into time slots uniquely identified by said particular unique code, forming a data bit stream with said unique code patterns and forwarding the data bit stream to an adjacent one of said nodes; and receive means for receiving the data bit stream from the network loop and detecting one of said code patterns which is uniquely assigned to the own node from the received data bit stream and extracting data packets from time slots which are uniquely identified by the detected code pattern.

* * * * *